United States Patent [19]

Grieff

[11] Patent Number: 5,253,355
[45] Date of Patent: Oct. 12, 1993

[54] APPARATUS AND METHOD FOR DEVELOPING WAIT STATES DURING ADDRESSING OPERATION BY USING UNUSED ADDRESS BITS

[75] Inventor: Thomas W. Grieff, Spring, Tex.

[73] Assignee: Compaq Computer Corporation, Houston, Tex.

[21] Appl. No.: 612,132

[22] Filed: Nov. 13, 1990

[51] Int. Cl.⁵ .................................. G06F 12/06
[52] U.S. Cl. ......................... 395/425; 395/400; 364/DIG. 1; 364/259.8; 364/259.9; 364/261.8; 364/271.5
[58] Field of Search ............ 395/400, 425, 725; 364/200 MS File, 900 MS File

[56] References Cited

U.S. PATENT DOCUMENTS

| | | | |
|---|---|---|---|
| 4,503,491 | 3/1985 | Lushtak et al. | 395/400 |
| 4,611,279 | 9/1986 | Andresen et al. | 395/425 |
| 4,613,936 | 9/1986 | Andresen | 395/550 |
| 5,070,473 | 12/1991 | Takano et al. | 395/725 |

*Primary Examiner*—Joseph L. Dixon
*Assistant Examiner*—Hiep T. Nguyen
*Attorney, Agent, or Firm*—Pravel, Hewitt, Kimball & Krieger

[57] ABSTRACT

An apparatus and method for providing wait states using address bits not used in the device address decode. The upper address bits of a computer system are not used for peripheral and memory device decoding purposes. The unused bits are driven to indicate the desired number of wait states to be developed for each selected device, while still allowing a normal decode of the devices. Wait state and ready logic is provided which allows each device address to be assigned one of several possible wait state lengths by driving the most significant bits of the address. The address decode based wait state determination is overridden for RAM operations, and followed for ROM and peripheral operations.

4 Claims, 2 Drawing Sheets

APPARATUS AND METHOD FOR DEVELOPING WAIT STATES DURING ADDRESSING OPERATION BY USING UNUSED ADDRESS BITS

BACKGROUND OF THE INVENTION

1. Field of the Invention

The invention generally relates to microprocessor circuitry, and more particularly, to the development of wait states during data transfers.

2. Description of the Related Art

With the advances in integrated circuit technology, particularly that related to microprocessors, there is a disparity between microprocessor circuits and many of the support circuits, including memory, used with the microprocessor. As microprocessor speeds increase to 20 and 25 MHz and above, the speeds of the memory devices and various peripheral devices that interact with the microprocessor must increase in a like manner. However, for memory devices and other devices to increase at this speed, their cost generally increases quite dramatically, particularly if a technology type must be changed, for instance, from dynamic random access memory (DRAM) to static random access memory (SRAM). Therefore, to save cost in many designs, wait states are inserted in access cycles. The number of wait states that are inserted depends upon the particular speed of the microprocessor and the response times of the particular device being accessed. Customarily, this wait state generation is developed based on the address decode used to enable the particular device, which then in turn triggers wait state generation circuitry related to that particular device. While this is quite satisfactory for a completed design, where the various speeds of the parts utilized in the circuits vary, such as during development of the particular system or on a batch-by-batch or lot-by-lot basis, this particular device related decode and wait state generation becomes quite difficult. The wait state generation circuitry must be redesigned for each particular embodiment. If this is a problem that develops during development of the particular system, then this delays development time while these ancillary circuits are redesigned to implement the single change of the microprocessor, for example.

Therefore, it is desirable to be able to simply and easily change the number of wait states for a particular device without requiring a hardware redesign to perform that function.

SUMMARY OF THE INVENTION

The circuit according to the present invention utilizes several unused address bits, preferably the higher order address bits, to determine the wait states to be applied to a given data access. The peripheral devices and memory are designed to respond to address information based on less than the entire number of address bits available so that the decode used to operate and activate those particular devices and decodes internal to the devices do not require the use of the upper address bits. Thus, the upper address bits can be utilized to indicate wait state selection. If a particular upper address value presented for the access indicates that a single wait state should be developed, for example, then a different upper address value presented may indicate that a different number, for example, two, wait states should be inserted in the access. The lower bits used to actually access the device and inside the device are not changed, so the device decode need not be changed.

Therefore, with this technique no hardware needs to be changed to provide new wait state development, but simply changing the high order bits of the address presented for that particular device results in a wait state difference. It is relatively simple during development to readdress the particular device at a different high order address, leaving the address bits which are actually decoded the same and thus easily change the number of wait states used in the access. Thus, wait state experimentation and development can be rapidly implemented without requiring extensive detail changes in the hardware, particularly for each device of interest.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
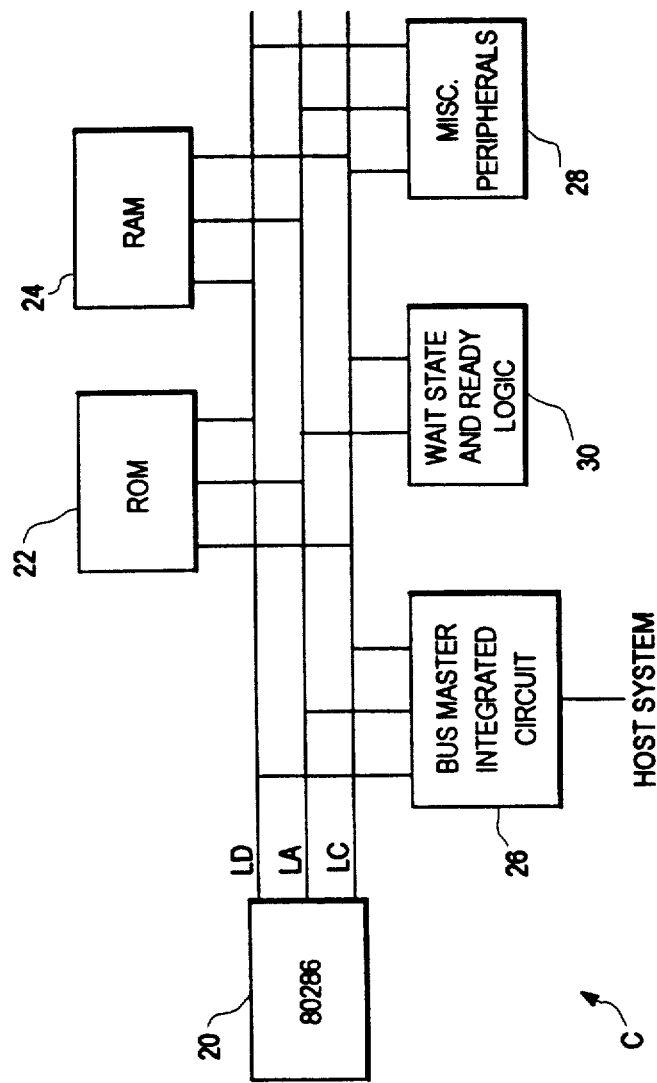
FIG. 1 is a block diagram of a computer system incorporating the wait state and ready logic of the present invention.

Referring now to FIG. 1, a computer system C incorporating the present invention is illustrated. The computer system C includes a microprocessor 20, preferably an 80286 microprocessor from Intel Corporation, Harris Semiconductor or others. Familiarity with the interface and control signals of this particular microprocessor is assumed in this description. For reference, refer to the 1990 Microprocessor data book published by Intel Corporation. In the preferred embodiment, the microprocessor 20 has a clock rate of 25 MHz. The microprocessor 20 includes data lines referred to as the LD bus, address outputs referred to as the LA bus and numerous control signals referred to as the LC bus. A read only memory (ROM) 22, preferably a maximum of 128 kbytes in size, is connected to the LD, LA and LC buses to provide stored operation instructions for the microprocessor 20. A random access memory (RAM) 24, preferably 128 kbytes to 256 kbytes in size, is connected to the LD, LA and LC buses for providing temporary storage capabilities for the computer system C.

A bus mastering integrated circuit or BMIC 26 is connected between the LA, LD and LC buses and a host computer system in the preferred embodiment. The BMIC 26 is preferably a device which is utilized to control the host system bus to transfer information from the computer system C to a larger host system. An exemplary and preferable BMIC 26 is the 82355 bus mastering integrated circuit designed for the Extended Industry Standard Architecture (EISA) by Intel Corporation.

Miscellaneous peripheral devices 28, such as counters, timers, interrupt controllers, input/output (I/O) ports, and other peripheral devices are well known are also connected to the LD, LA and LC buses to allow interaction with the microprocessor 20. The miscellaneous devices 28 include address decode logic which enables operation of the appropriate device. Wait state and ready logic 30 is connected to the LA and LC buses so that addresses can be received, as well as state control information, by the wait state and ready logic 30 and ready information can be returned to the microprocessor 20 to allow cycles to proceed.

Figure 2:
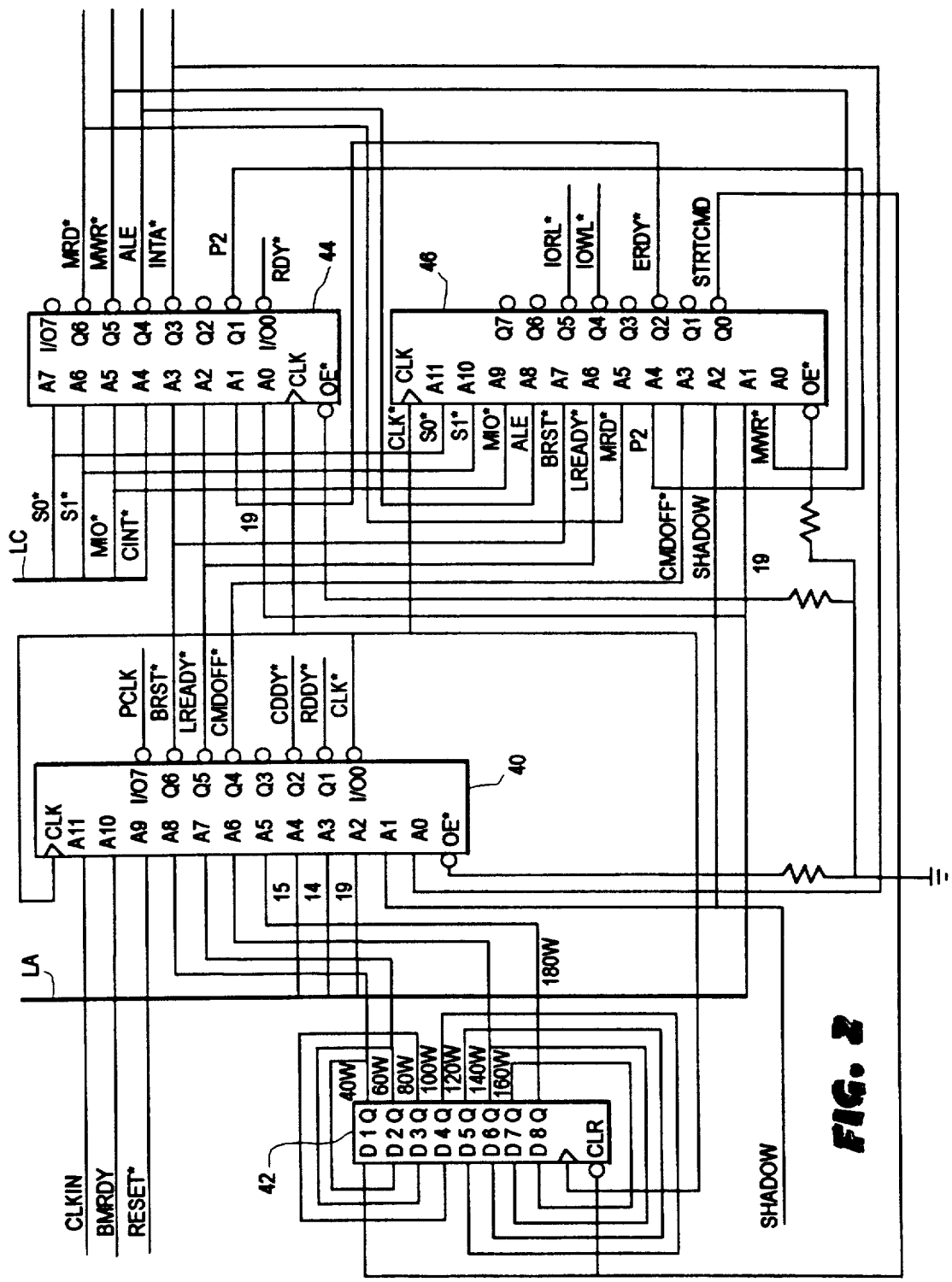
FIG. 2 is a schematic diagram of portions of the wait state and ready logic of FIG. 1.

Details of the wait state and ready logic 30 are shown in FIG. 2. Preferably a series of programmable array logic (PAL) devices are utilized in the wait state and ready logic 30 to perform the various combinatorial and state based operations. A READY PAL 40 is utilized as one element. Preferably, the READY PAL 40 includes a series of internal D-type flip-flops to allow registered operation. A signal referred to as CLKIN is provided to the READY PAL 40 and is the basic clocking signal of the microprocessor 20. Therefore, in the preferred embodiment, this is a 50 MHz clocking signal. An additional input received by the READY PAL 40 is the BMRDY signal, which is an indication from the BMIC 26 that operations being requested from the BMIC 26 are ready as indicated by the BMIC LRDY output. A signal referred to as RESET* is provided to the READY PAL 40 and indicates, when active low, that the computer system C is being reset. A series of address bits are provided as inputs to the READY PAL 40, preferably the 19, 15 and 14 bit position address values. A signal referred to as SHADOW is additionally provided to the READY PAL 40 to indicate that the feature wherein the ROM 22 information is copied into the RAM 24 and then ROM operations are answered out of the RAM 24, referred to as shadowing, is active. An additional input to the READY PAL 40 is a signal referred to as INTA*, which indicates that an interrupt cycle is in process by the microprocessor 20. The clocking signal for the flip-flops contained in the READY PAL 40 is provided by an output of the READY PAL 40 and its operation will be discussed. The final inputs to the READY PAL 40 are a series of signals which are delayed with respect to each other and produced as the output of an eight bit D-type flip-flop 42.

The flip-flop 42 is connected to produce a delayed series of signals based on a single input, much in the manner of a shift register. Thus the appearance of the various signals at the outputs of the flip-flop 42 are successively delayed from the actual triggering event, thus allowing timing of events. The clocking signal of the flip-flop 42 is provided by the CLK* signal provided as the output of the READY PAL 40. A signal referred to as STRTCMD is provided to the least significant bit D input of the flip-flop 42 and to the inverted clear input of the flip-flop 42. The remaining D inputs of the flip-flop 42 are connected, successively, to the output of the lesser significant bit of the flip-flop 42 such that a shift register operation effectively results. The outputs, in order from least significant to most significant of the flip-flop 42 are referred to as 40W, 60W, 80W, 100W, 120W, 140W, 160W and 180W, indicating the number of nanoseconds delayed from the development of the initial cycle based on the provision of a 50 MHz CLK* signal to the clocking input of the flip-flop 42.

The READY PAL 40 produces a series of outputs which are utilized by other devices in the wait state and ready logic 30. These signals are the BRST* signal, which is a synchronized version of the RESET* signal received by the READY PAL 40; the LREADY* signal, which is a signal which is used to indicate when the particular devices are ready to the microprocessor 20 and will be described in more detail; the CMDOFF* signal; the PCLK signal which is the clock signal provided to the microprocessor 20; and the CLK* signal as previously discussed. The LREADY* signal includes the wait state information and delays used in the operation of the present invention. The equations for the READY PAL 40 are as follows:

| | |
|---|---|
| LREADY: | = LA19* · LA15* · LA14* · 40W · INTA* + LA19* · LA15* · LA14 · 60W · INTA* + CDDY · RDDY · LA19* · LA15 · LA14* · 180W · INTA* + LA19* · LA15 · LA14 · 180W · INTA* + LA19 · SHADOW* · 140W · INTA* + LA19 · SHADOW · INTA* + INTA * 180W |
| CMDOFF: | = LA19* · LA15* · LA14* · 40W · INTA* + CDDY · RDDY · LA19* · LA15 · LA14* · 180W · INTA* + LA19 · SHADOW · INTA* + LREADY |
| CDDY: | = BMRDY |
| RDDY: | = CDDY |
| CLK | = CLKIN* |
| PCLK* | = CLKIN |
| BRST: | = RESET |

Thus the LREADY signal is active, for non-interrupt cycles, after one wait state for addresses having a most significant byte of 0 to 7 and least significant 4 bytes of 0000 to 3FFF, for two wait states for addresses having a most significant byte of 0 to 7 and least significant 4 bytes of 4000 to 7FFF, for four wait states for addresses having a most significant byte of 0 to 7 and having the least significant 4 bytes of 8000 to BFFF, for five wait states for addresses having a most significant byte of 0 to 7 and least significant 4 bytes of C000 to FFFF, for zero wait states for addresses greater than 80000 if shadowing is enabled, for five wait states for addresses greater than 80000 if shadowing is disabled and five wait states for interrupt cycles. In the preferred embodiment all I/O operations occur in the address range below FFFF, with certain flip-flop based registers at addresses in the range of 0000 to 3FFF and so using one wait state, certain more complex peripheral devices such as a SCSI controller chip in the range of 4000 to 7FFF, the BMIC 26 and another peripheral device residing in the range 8000 to BFFF, and certain devices such as an interrupt controller residing at addresses in the range of C000 to FFFF. If the address decode to enable the SCSI chip is based on the lower 14 bits being 0400, then using an I/O address of 0400 results in one wait state, an I/O address of 4400 results in two wait states, an I/O address of 8400 results in four wait states and an address of C400 results in five wait states being used. Thus simply changing the upper bits of the reference address changes the hardware response characteristics without changing the device decode or any other related logic. The addresses in the range above 80000 are reserved in the preferred embodiment for the ROM 22 and so wait states are needed for non-shadowed operation and not necessary for shadowed operation as the RAM 24 is sufficiently fast for zero wait state operations.

The CMDOFF signal is active for non-interrupt cycles after one wait state for addresses having a most significant byte of 0 to 7 and least significant 4 bytes of 0000 to 3FFF, for four wait states for addresses having a most significant byte of 0 to 7 and having the least significant 4 bytes of 8000 to BFFF, and for zero wait states for shadowing references and when the LREADY signal goes active.

The RDDY and CDDY signals are delayed versions of the BMRDY signal, while the CLK and PCLK signals are just pass throughs of the CLKIN signal and the BRST signal is a synchronized version of the RESET signal.

A MEMORY STATE PAL 44 is used to develop certain of the signals used by the READY PAL 40 and other circuitry to indicate the state of the microprocessor 20 in its various cycles. Preferably, the MEMORY STATE PAL 44 includes a series of D-type flip-flops for registered operation. The clocking signal provided to the MEMORY STATE PAL 44 is the CLK* signal provided by the READY PAL 40. The inputs to the MEMORY STATE PAL 44 include the S0* and S1* signals developed by the microprocessor 20 to indicate its state; the MIO* signal, developed by the microprocessor 20 to indicate whether a memory or I/O operation is in progress; and the CINT* signal, which is produced by the microprocessor 20 to indicate a code or data or interrupt cycle. Other inputs received by the MEMORY STATE PAL 44 are the BRST* and LREADY* signals produced by the READY PAL 40 and the 19th bit of the LA bus. An additional input to the MEMORY STATE PAL 44 is the ERDY* signal provided by another PAL in the wait state and ready logic 30 to indicate memory operation status.

The outputs of the MEMORY STATE PAL 44 include the MRD* signal, which indicates a memory read operation; the MWR* signal, which indicates memory write operations; the ALE signal or address latch enable signal; the INTA* signal, which as previously discussed indicates an interrupt cycle; the P2 signal, which is an indication that the microprocessor 20 is in a desired intermediate state; and the RDY* signal which is provided to the microprocessor 20 to indicate that the particular responding device has completed operation and is ready to proceed. The preferred microprocessor of the present embodiment monitors the RDY* signal and thus waits until it is received to commence operations. Therefore, by delaying the RDY* signal returned to the microprocessor 20, wait states can be developed.

The equations utilized by the MEMORY STATE PAL 44 are as follows:

| | |
|---|---|
| INTA: | = MIO* · ALE · S0 · S1 · CINT · BRST* + INTA · P2 · ERDY* · LREADY* + INTA · P2* |
| P2*: | = ALE + P2 |
| ALE*: | = S0* · S1* + ALE + BRST |
| MWT: | = LA19* · MIO · S0 · S1* · ALE · BRST* + MWT · P2 · ERDY* · LREADY* + MWT · P2* |
| MRD | = MIO · S1 · S0* · ALE · BRST* + MRD · P2 · ERDY* · LREADY* + MRD · P2* |
| RDY | = ERDY + LREADY |

The INTA signal thus indicates an interrupt cycle, the MWT signal indicates an uncompleted memory write operation to the RAM 24, the MRD signal indicates an uncompleted memory read cycle, the ALE signal indicates valid address period, the P2 signal indicates a particular portion of the addressing cycle and the RDY signal is the simple OR of the LREADY signal from the READY PAL 40 and the ERDY signal to indicate that the responding device is ready.

A third PAL 46, referred to as the IO STATE PAL, provides additional information necessary for the wait state logic 30. Again, preferably the IO STATE PAL 46 contains a series of D-type flip-flops to allow registered operation. The clocking signal for the IO STATE PAL 46 is the CLK* signal. Other signals received by the IO STATE PAL 46 are the S0*, S1* and MIO* signals from the microprocessor 20; the ALE, MWR* and MRD* signals from the MEMORY STATE PAL 44; the BRST*, LREADY* and CMDOFF* signals from the READY PAL 40; the SHADOW signal and the 19th bit of the LA bus. The outputs of the IO STATE PAL 46 are the IORL* and IOWL* signals, which are latched versions of I/O read and I/O write operations and are used internally by the IO STATE PAL 46; the ERDY* signal, which is provided to the MEMORY STATE PAL 44; and the STRTCMD signal which is provided to the D input of the least significant bit of the flip-flop 42. The equations utilized in the IO STATE PAL 46 are as follows:

| | |
|---|---|
| IORL: | = MIO* · S1 · S0* · ALE · BRST* + MIO* · S1 · S0 · ALE · BRST* + IORL · P2 · LREADY* + IORL · P2* |
| IOWL: | = MIO* · S1* · S0 · ALE · BRST* + IOWL · P2 · CMDOFF* + IOWL · P2* |
| ERDY: | = MWT + MRD · SHADOW + MRD · LA19* |
| STRTCMD: | = IORL* · IOWL* · MRD* + IORL* · IOWL* · LA19* + IORL* · IOWL* · SHADOW |

Therefore the IORL signal indicates an uncompleted I/O read operation which continues until ready is asserted, the IOWL signal indicates an uncompleted I/O write cycle which continues until the CMDOFF signal is asserted to allow a data hold period if necessary and the STRTCMD signal is low until an I/O cycle commences or a read from the unshadowed ROM 22 occurs. The ERDY signal indicates that an operation is taking place to the RAM 24 and is used to override the address decode based wait state information supplied by the LREADY signal for RAM 24 accesses.

As can be appreciated, this development of wait states for the I/O devices based on address bits above their address decode level allows simple changing of the wait states developed in the cycle, thus simplifying development operations and other operations needing simply changed wait state features.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for developing wait states during addressing operations to a series of devices attached to a bus, each of the devices requiring a plurality of bits defining an address value range for decoding purposes to identify the device, the method comprising:

providing an address value on the bus having a plurality of bits, the number of said bits being greater than the number of bits required to decode each of the devices;

decoding said provided address value to enable one of the attached devices using the plurality of bits required for decoding purposes to identify the attached device;

decoding a plurality of bits in said address value other than the plurality of bits required for decoding purposes to identify the attached device to indicate a desired number of wait states; and providing wait states in the addressing operation based on the indicated desired number.

2. The method of claim 1, wherein the addressing operations can be of a plurality of logical types and further comprising:

overriding the provision of the desired number of wait states based on decoding said address value when the addressing operation is of a defined logical type.

3. An apparatus for developing wait states during addressing operations to a series of devices attached to a bus, each of the devices requiring a plurality of bits defining an address value range for decoding purposes to identify the device, the apparatus comprising:

means for controlling an addressing operation and providing an address value on the bus having a plurality of bits, the number of said bits being greater than the number of bits required to decode each of the devices;

means for receiving an decoding said provided address value to enable one of the attached devices using the plurality of bits required for decoding purposes to identify the attached device;

means for receiving and decoding a plurality of bits in said address value other than the plurality of bits required for decoding purposes to identify the attached device to indicate a desired number of wait states; and means coupled to said wait state decoding means for providing wait states in the addressing operation based on the indicated desired number.

4. The apparatus of claim 3 wherein the addressing operations can be of a plurality of logical types, and further comprising:

means coupled to said wait state providing means and said addressing operation controlling means for overriding the provision of the desired number of wait states in the addressing operation based on decoding said address value when the addressing operation is of a defined logical type.

* * * * *

UNITED STATES PATENT AND TRADEMARK OFFICE
CERTIFICATE OF CORRECTION

PATENT NO. : 5,253,355
DATED : October 12, 1993
INVENTOR(S) : Thomas W. Grieff

It is certified that error appears in the above-identified patent and that said Letters Patent is hereby corrected as shown below:

In col. 8, line 3, please delete "an" and replace with --and--.

Signed and Sealed this

Nineteenth Day of April, 1994

Attest:

BRUCE LEHMAN

Attesting Officer     Commissioner of Patents and Trademarks